(12) United States Patent
Han (10) Patent No.: US 10,962,227 B2
(45) Date of Patent: Mar. 30, 2021

(54) COMBUSTOR AND GAS TURBINE INCLUDING THE SAME

(71) Applicant: DOOSAN HEAVY INDUSTRIES & CONSTRUCTION CO., LTD., Changwon-si (KR)

(72) Inventor: Dongsik Han, Changwon-si (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 445 days.

(21) Appl. No.: 16/167,325

(22) Filed: Oct. 22, 2018

(65) Prior Publication Data

US 2019/0128521 A1 May 2, 2019

(30) Foreign Application Priority Data

Oct. 31, 2017 (KR) .................. 10-2017-0144202

(51) Int. Cl.
*F23R 3/34* (2006.01)
*F23R 3/00* (2006.01)
*F01D 9/02* (2006.01)
*F23R 3/28* (2006.01)
*F02C 7/22* (2006.01)

(52) U.S. Cl.
CPC .............. *F23R 3/002* (2013.01); *F01D 9/023* (2013.01); *F02C 7/222* (2013.01); *F23R 3/28* (2013.01); *F23R 3/283* (2013.01); *F23R 3/346* (2013.01); *F05D 2240/35* (2013.01); *F05D 2260/96* (2013.01); *F05D 2260/963* (2013.01); *F23R 2900/00014* (2013.01)

(58) Field of Classification Search
CPC ............ F23R 2900/00014; F23R 3/346; F05D 2260/963; F02C 7/222
See application file for complete search history.

(56) References Cited

U.S. PATENT DOCUMENTS 9,151,500 B2 * 10/2015 Chen ...................... F23R 3/04
2012/0304648 A1 12/2012 Byrne et al.
(Continued)

FOREIGN PATENT DOCUMENTS

JP 6175193 B2 8/2017
KR 10-0674597 B1 1/2017

*Primary Examiner* — Gerald L Sung
*Assistant Examiner* — Rene D Ford
(74) *Attorney, Agent, or Firm* — Invenstone Patent, LLC (57) ABSTRACT

A combustor reduces combustion vibration and the generation of nitrogen oxides and includes a burner to mix fuel with compressed air and to eject the mixture; a liner that is coupled to one end of the burner and forms a combustion chamber in which the fuel-air mixture is combusted to produce high-pressure gas; a transition piece to receive a flow of the high-pressure gas from the liner and to discharge the high-pressure gas to a turbine; a plurality of resonance modules disposed on an outer circumferential surface of the liner at positions spaced apart from each other along a circumferential direction of the liner; and a fuel supply unit coupled to each of the plurality of resonance modules and configured to supply fuel to each of the plurality of resonance modules. The resonance modules may be disposed on an outer circumferential surface of the transition piece instead of the liner.

14 Claims, 8 Drawing Sheets

(56) References Cited

U.S. PATENT DOCUMENTS

2013/0031908 A1* 2/2013 DiCintio .............. F23R 3/346
60/752
2013/0174558 A1* 7/2013 Stryapunin ............ F23R 3/346
60/734

* cited by examiner

COMBUSTOR AND GAS TURBINE INCLUDING THE SAME

CROSS-REFERENCE TO RELATED APPLICATIONS

This application claims priority to Korean Patent Application No. 10-2017-0144202 filed on Oct. 31, 2017, the disclosure of which is incorporated herein by reference in its entirety.

BACKGROUND OF THE DISCLOSURE

Field of the Disclosure

Exemplary embodiments of the present disclosure relate to a combustor and a gas turbine including the combustor.

Description of the Related Art

A gas turbine is a power engine configured to mix fuel with air compressed by a combustor, combust the mixture, and rotate a turbine using high-temperature gas generated by the combustion. Gas turbines are used to drive a generator, an aircraft, a vessel, a train, and so forth.

Generally, gas turbines include a compressor, a combustor, and a turbine. The compressor draws external air, compresses the air, and then transmits the compressed air to the combustor. Air compressed by the compressor enters a high-pressure and high-temperature state. The combustor mixes fuel with compressed air supplied from the compressor, and combusts the mixture. Combustion gas generated by the combustion is discharged to the turbine. Turbine blades provided in the turbine are rotated by the combustion gas, whereby power is generated. Generated power may be used in various fields, e.g., for generating electricity, driving a mechanical device, etc.

SUMMARY OF THE DISCLOSURE

An object of the present disclosure is to provide a combustor capable of reducing combustion vibration and generation of nitrogen oxides, and a gas turbine including the combustor.

In accordance with one aspect of the present disclosure, a combustor may include a burner including a plurality of nozzles configured to mix fuel with compressed air and to eject a mixture of the fuel and the compressed air; a liner that is coupled to one end of the burner and forms a combustion chamber in which the fuel-air mixture is combusted to produce high-pressure gas; a transition piece configured to receive a flow of the high-pressure gas from the liner and to discharge the high-pressure gas to a turbine; a plurality of resonance modules disposed on an outer circumferential surface of the liner at positions spaced apart from each other along a circumferential direction of the liner; and a fuel supply unit coupled to each of the plurality of resonance modules and configured to supply fuel to each of the plurality of resonance modules.

The liner may include an inner liner in which the combustion of the mixture occurs, and an outer liner enclosing the inner liner and spaced apart from the inner liner by a predetermined distance, and the plurality of resonance modules may be disposed on an outer circumferential surface of the inner liner at positions spaced apart from each other along the circumferential direction.

The fuel supply unit may include a main supply pipe disposed along the circumferential direction on an outer circumferential surface of the outer liner and configured to receive fuel from an external fuel supply device; and a plurality of connection pipes each coupled at one end to the main supply pipe and at the other end to one of the plurality of resonance modules and configured to supply the fuel from the main supply pipe to the one resonance module. The main supply pipe may encircle the outer liner.

The plurality of connection pipes may include a plurality of pairs of connection pipes, and each pair is respectively coupled to opposite side surfaces of a resonance module among the plurality of resonance modules.

Each resonance module may include a main body including an upper surface in which a plurality of first through-holes are formed to communicate with an interior space of the main body in order to draw compressed air into the interior space; and a bottom side coupled to the outer circumferential surface of the inner liner, the bottom side of the main body surrounding an area of the inner liner in which a plurality of second through-holes are formed to communicate with an inner surface of the inner liner. The compressed air may be drawn into the resonance module through the plurality of first through-holes flows through the plurality of second through-holes. The main body may have a cylindrical shape or a prismatic shape by which the interior space is defined. The main body and the main supply pipe may overlap each other in a direction perpendicular to the outer circumferential surface of the inner liner.

In accordance with another aspect of the present disclosure, the above combustor may include a plurality of resonance modules disposed on an outer circumferential surface of the transition piece at positions spaced apart from each other along a circumferential direction of the transition piece, rather than the plurality of resonance modules disposed on an outer circumferential surface of the liner at positions spaced apart from each other along a circumferential direction of the liner.

In accordance with yet another aspect of the present disclosure, there is provided a gas turbine comprising a compressor to compress air, a combustor to produce combustion gas by mixing fuel with the compressed air and combusting the mixture, and a turbine configured to be rotated by the combustion gas to generate power. The combustor of the gas turbine may include the above burner; the above liner; the above transition piece; a plurality of resonance modules configured according to one of a first disposition with respect to an outer circumferential surface of the liner at positions spaced apart from each other along a circumferential direction of the liner, and a second disposition with respect to an outer circumferential surface of the transition piece at positions spaced apart from each other along a circumferential direction of the transition piece; and the above fuel supply unit. The liner may include an inner liner in which the combustion of the mixture occurs, and an outer liner enclosing the inner liner and spaced apart from the inner liner by a predetermined distance, the inner transition piece having an outer circumferential surface configured to receive the plurality of resonance modules. The transition piece may include an inner transition piece through which the high-pressure gas flows, and an outer transition piece enclosing the inner transition piece and spaced apart from the inner transition piece by a predetermined distance, the inner transition piece having an outer circumferential surface configured to receive the plurality of resonance modules. The fuel supply unit may include a main supply pipe arranged along the circumferential direction and configured to receive fuel from an external fuel supply device; and a plurality of connection pipes each coupled at one end to the main supply pipe and at the other end to one of the plurality of resonance modules and configured to supply the fuel from the main supply pipe to the one resonance module. Here, the main supply pipe may be disposed on either surface of an outer circumferential surface of the outer transition piece and an outer circumferential surface of the outer transition piece, according to the one of the first and second dispositions.

The main supply pipe may encircle either one of the outer liner and the outer transition piece, according to the one of the first and second dispositions.

Each resonance module may include a main body including an upper surface in which a plurality of first through-holes are formed to communicate with an interior space of the main body in order to draw compressed air into the interior space; and a bottom side coupled to the outer circumferential surface of one of the inner liner and the outer circumferential surface of the inner transition piece according to the one of the first and second dispositions, the bottom side of the main body surrounding a plurality of second through-holes formed to communicate with an inner surface of either the inner liner or the inner transition piece. The compressed air may be drawn into the resonance module through the plurality of first through-holes flows through the plurality of second through-holes. The main body and the main supply pipe may overlap each other in a direction perpendicular to the upper surface of the main body.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other objects, features and other advantages of the present disclosure will be more clearly understood from the following detailed description taken in conjunction with the accompanying drawings, in which.

DESCRIPTION OF SPECIFIC EMBODIMENTS

Since the present disclosure may be modified in various forms, and may have various embodiments, preferred embodiments will be illustrated in the accompanying drawings and described in detail with reference to the drawings. However, this is not intended to limit the present disclosure to particular modes of practice, and it is to be appreciated that all changes, equivalents, and substitutes that do not depart from the spirit and technical scope of the present disclosure are encompassed in the present disclosure.

The terminology used herein is for the purpose of describing particular embodiments only and is not intended to be limiting. In the present disclosure, the singular forms are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Hereinafter, preferred embodiments of the present disclosure will be described in detail with reference to the accompanying drawings. Reference now should be made to the drawings, in which the same reference numerals are used throughout the different drawings to designate the same or similar components. Details of well-known configurations and functions may be omitted to avoid unnecessarily obscuring the gist of the present disclosure. For the same reason, in the accompanying drawings, elements may be exaggerated, omitted, or depicted schematically.

Hereinafter, a gas turbine including a combustor in accordance with a first embodiment of the present disclosure will be described with reference to FIGS. 1 to 9. Here, a gas turbine 1000 in accordance with the first embodiment of the present disclosure may include a compressor 1100, a combustor 1200, and a turbine 1300. According to the present embodiment, in the combustor 1200 which mixes fuel with compressed air and combusts the mixture, resonance modules 1280 and a fuel supply unit 1290 which are used to supply the compressed air and the fuel into a liner 1250 may be disposed on the liner 1250. Combustion vibration and exhaust of nitride oxides, etc. created in the combustor 1200 may be reduced by the resonance modules 1280 and the fuel supply unit 1290.

Figure 1:
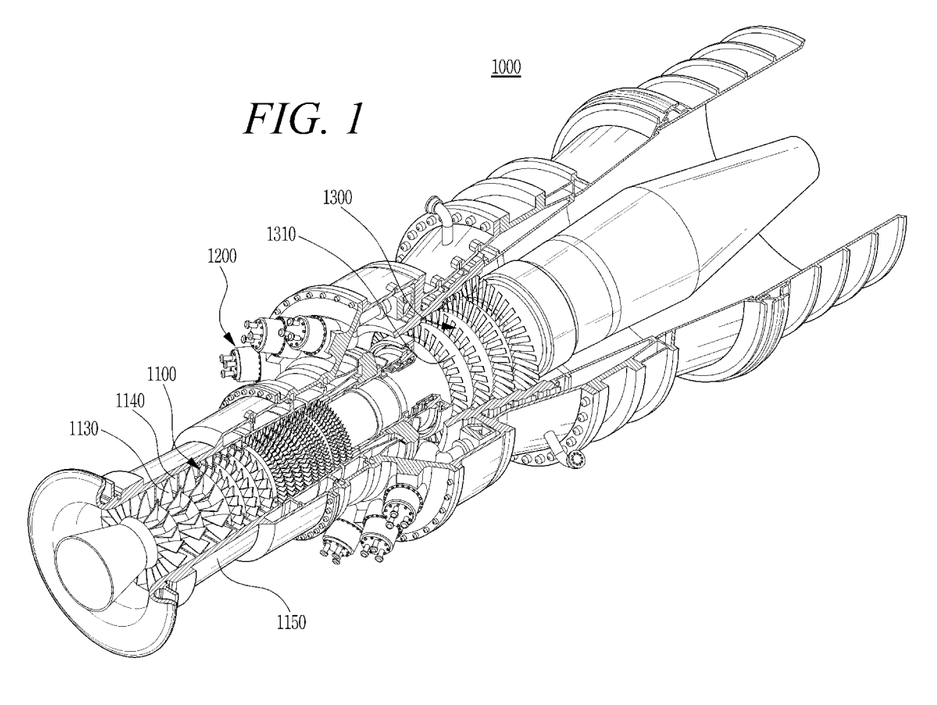
FIG. 1 is a cutaway perspective view of a gas turbine including a combustor in accordance with the present disclosure.

The thermodynamic cycle of the gas turbine 1000 according to the present embodiment ideally complies with the Brayton cycle. The Brayton cycle may consist of four processes including an isentropic compression (adiabatic compression) process, an isobaric heat supply process, an isentropic expansion (adiabatic expansion) process, and an isobaric heat rejection process. In other words, the gas turbine may draw air from the atmosphere, compress the air, combust fuel under isobaric conditions to emit energy, expand this high-temperature combustion gas to convert the thermal energy of the combustion gas into kinetic energy, and thereafter discharge exhaust gas with residual energy to the atmosphere. As such, the Brayton cycle may consist of four processes including compression, heat addition, expansion, and heat rejection. Embodying the Brayton cycle, the gas turbine 1000 may include a compressor, a combustor, and a turbine, as shown in FIG. 1. Although the following description will be made with reference to FIG. 1, the description of the present disclosure may also be widely applied to a turbine engine having a configuration equivalent to that of the gas turbine 1000 illustrated in FIG. 1.

FIG. 1 illustrates the structure of the gas turbine 1000.

Referring to FIG. 1, the compressor 1100 of the gas turbine 1000 may draw air from the outside and compress the air. The compressor 1100 may supply air compressed by compressor blades 1130 to the combustor 1200 and also supply air for cooling to a high-temperature area needed to be cooled in the gas turbine 1000. Here, drawn air is compressed in the compressor 1100 through an adiabatic compression process, so that the pressure and the temperature of air passing through the compressor 1100 are increased.

The compressor 1100 is designed in the form of a centrifugal compressor or an axial compressor. Generally, the centrifugal compressor is used in a small gas turbine. On the other hand, in a large gas turbine such as the gas turbine 1000 shown in FIG. 1, a multi-stage axial compressor 1100 is generally used so as to compress a large amount of air. Here, in the multi-stage axial compressor 1100, the blades 1130 of the compressor 1100 rotate along with rotation of a rotor disk, compress drawn air, and transfer compressed air to vanes 1140 disposed at a following stage. Air is compressed gradually to high pressures while passing through the blades 1130 arranged in a multi-stage structure.

The vanes 1140 may be mounted to an inner surface of the housing 1150 such that a plurality of vanes 1140 form each stage. The vanes 1140 guide compressed air transferred from the compressor blades 1130, disposed at the preceding stage, toward the compressor blades 1130 disposed at the following stage. In the present embodiment, at least some of the plurality of vanes 1140 may be mounted so as to be rotatable within a predetermined range, e.g., to adjust the flow rate of air.

The compressor 1100 may be operated using some of the power output from the turbine 1300. To this end, a rotating shaft of the compressor 1100 may be directly coupled with a rotating shaft of the turbine 1300. In the case of the large gas turbine 1000, almost half of the output produced by the turbine 1300 may be consumed to drive the compressor 1100. Therefore, improvement in efficiency of the compressor 1100 may have a direct effect on increasing the overall efficiency of the gas turbine 1000.

Figure 2:
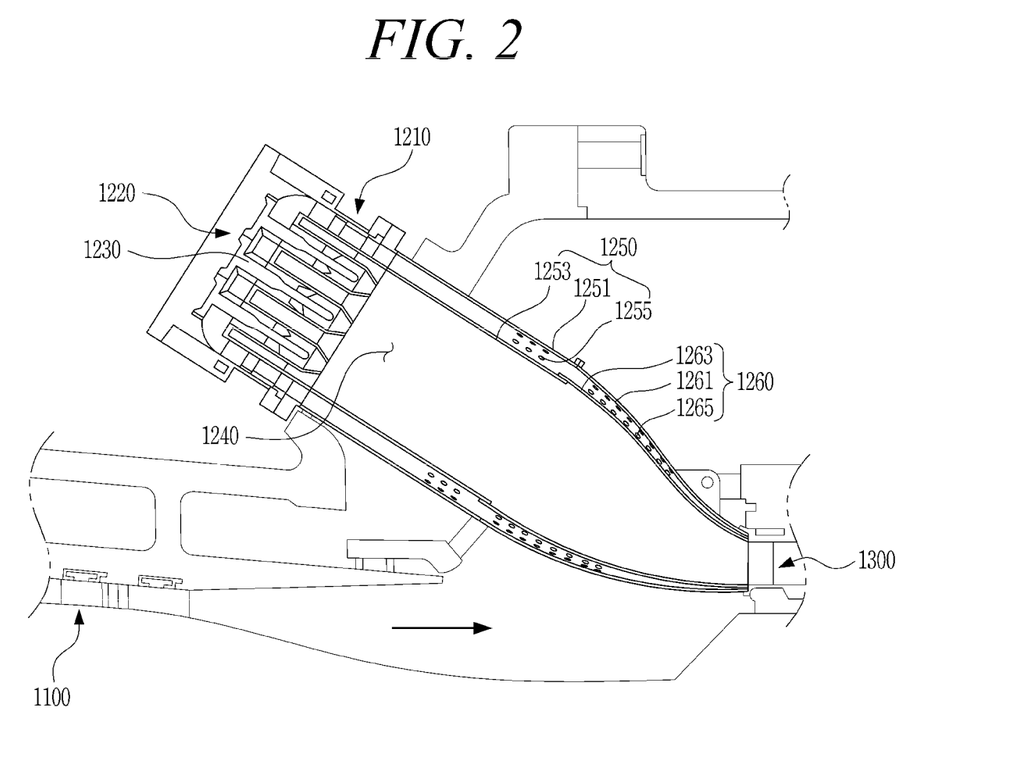
FIG. 2 is a sectional view schematically illustrating a combustor according to a first embodiment of the present disclosure.

The combustor 1200 may mix fuel with compressed air supplied from an outlet of the compressor 1100 and combust the mixture through an isobaric combustion process to make combustion gas having high energy. FIG. 2 illustrates an example of one combustor 1200 applied to the gas turbine 1000.

Referring to FIG. 2, the combustor 1200 in accordance with the present embodiment is disposed downstream of the compressor 1100 and may include a burner 1220, a liner 1250, and a transition piece 1260. Here, the liner 1250 and the transition piece 1260 are coupled in series to each other may and form a combustion chamber 1240 in the combustor 1200. The burner 1220 and the combustion chamber 1240 are coupled to each other may to form a combustion can in the combustor 1200. Thus, the combustor 1200 of FIG. 1 may be formed of a plurality of combustion cans arranged around the gas turbine 1000 at positions spaced apart from each other.

The burner 1220 is disposed in a nozzle casing 1210 having an annular shape and may include a plurality of combustion nozzles 1230. Fuel ejected from the combustion nozzles 1230 is mixed with air at an appropriate ratio to form a mixture having conditions suitable for combustion.

In the gas turbine 1000, gas fuel, liquid fuel, or hybrid fuel formed by a combination of them may be used. It is important to form combustion conditions for reducing the amount of exhaust gas such as carbon monoxide and nitrogen oxide, which are subject to legal regulations. Recently, use of pre-mixed combustion has increased because a combustion temperature can be reduced and uniform combustion is possible so that exhaust gas can be reduced, despite the difficulty to control the pre-combustion.

In the gas turbine 1000 according to the present embodiment, the pre-mixed combustion scheme is employed, so that compressed air is mixed with fuel ejected in advance from the combustion nozzles 1230, and the premixture then enters the combustion chamber 1240.

Figure 3:
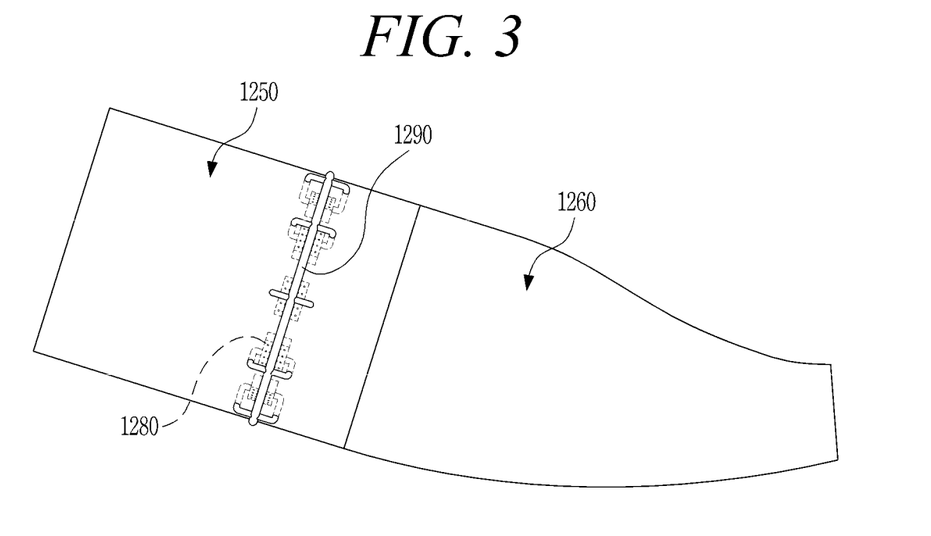
FIG. 3 is a schematic diagram illustrating a disposition of resonance modules and a fuel supply unit on a liner of the combustor in accordance with the first embodiment of the present disclosure.

FIG. 3 illustrates the resonance modules 1280 and the fuel supply unit 1290 disposed on the liner 1250 of the combustor 1200 of FIG. 2.

Referring to FIG. 3, in the combustor 1200 in accordance with the present embodiment, the plurality of resonance modules 1280 and the fuel supply unit 1290 may be disposed on the liner 1250. The plurality of resonance modules 1280 may be attached to an outer circumferential surface of the liner 1250 and arranged along a circumferential direction of the liner 1250 so that resonance space is formed on the outer circumferential surface of the liner 1250, thus reducing combustion vibration which generates during a combustion process. Furthermore, the fuel supply unit 1290 may supply fuel to each of the plurality of resonance modules 1280. Here, compressed air and fuel supplied through the resonance modules 1280 are mixed with each other and introduced into an interior of the liner 1250, whereby generation of nitride oxides, etc. in the combustion chamber 1240 may be reduced.

Referring to FIGS. 4 to 9, the liner 1250 may have a double-shell structure including an inner liner 1253 and an outer liner 1251. In other words, the liner 1250 may have a double-shell structure in which the outer liner 1251 encloses the inner liner 1253. Here, the inner liner 1253 is a hollow tubular member, and fuel and compressed air are combusted in an internal space, i.e., the combustion chamber 1240, defined in the inner liner 1253.

Figure 4:
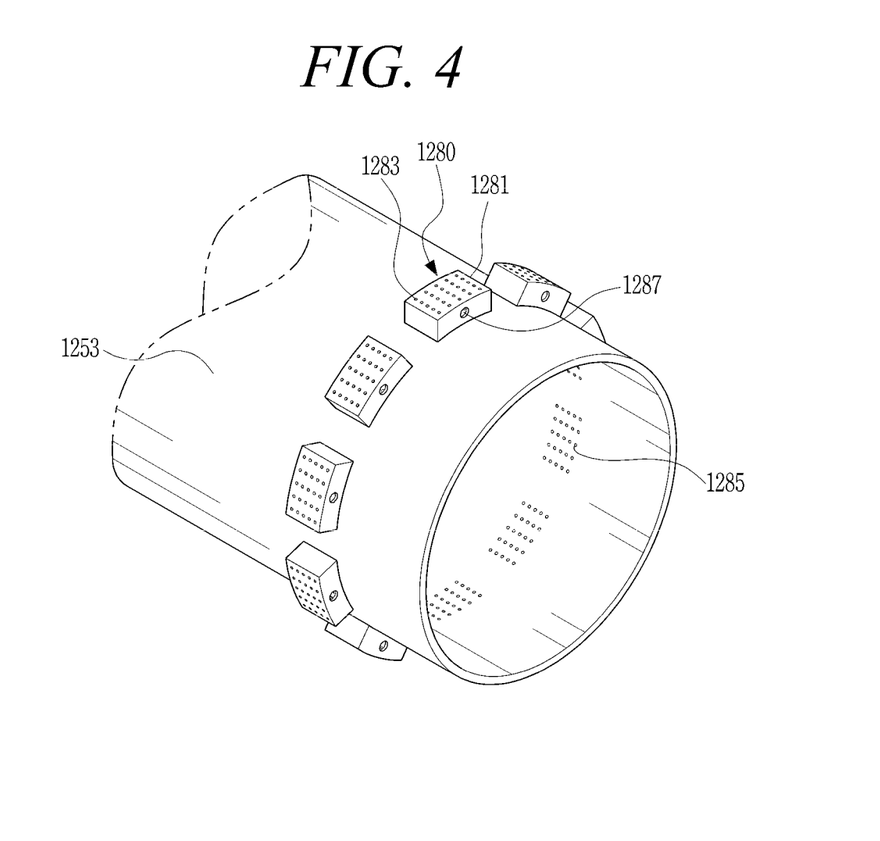
FIG. 4 is a perspective view schematically illustrating a disposition of the resonance modules on an outer circumferential surface of an inner liner in accordance with the first embodiment of the present disclosure.

According to the present embodiment, the plurality of resonance modules 1280 may be attached to an outer circumferential surface of the inner liner 1253. The plurality of resonance modules 1280 may be arranged at positions spaced apart from each other along the circumferential direction of the inner liner 1253. As shown in FIG. 4, the plurality of resonance modules 1280 form one line and are arranged along the circumferential direction of the inner liner 1253. However, the present disclosure is not limited to this. For example, the plurality of resonance modules 1280 may be arranged to form two or more lines.

Each of the plurality of resonance modules 1280 may have a box shape having a hollow interior space. In detail, a main body 1281 of each of the plurality of resonance modules 1280 may have a cylindrical or prismatic shape by which the interior space is defined. Here, the prism may include a triangular prism, a rectangular prism, a pentagonal prism, etc.

The main body 1281 may have an upper surface in which a plurality of first through-holes 1283 are formed and a bottom side which is open and faces toward the outer surface of the inner liner 1253. Here, the open bottom side of the main body 1281 is attached to the inner liner 1253 so as to surround an area of an outer surface of the inner liner 1253 in which a plurality of second through-holes 1285 are formed to communicate with an inner surface of the inner liner 1253. Thereby, compressed air flowing along an annular space defined between the inner liner 1253 and the outer liner 1251 may be drawn into the plurality of first through-holes 1283, and then supplied into the inner liner 1253 through the plurality of second through-holes 1285 via the main body 1281. According to the present embodiment, the structure of the main body 1281 of each of the plurality of resonance modules 1280 may form the above-described resonance space, thus reducing combustion vibration, which may be generated during a combustion process.

In the present embodiment, the fuel supply unit 1290 for supplying fuel may be coupled to the plurality of resonance modules 1280. The fuel supply unit 1290 may be provided in the form of a manifold for supplying fuel into the main bodies 1281 of the plurality of resonance modules 1280, and may include a main supply pipe 1291 and a plurality of connection pipes 1293.

Figure 5:
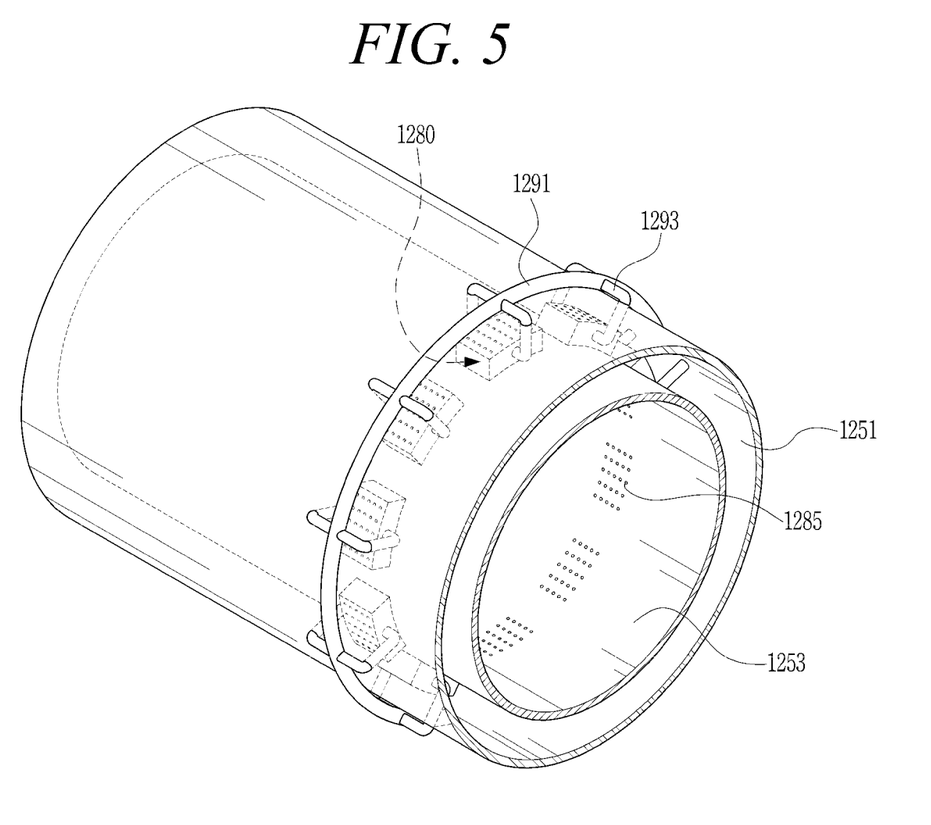
FIG. 5 is a perspective view schematically illustrating a disposition of the resonance modules and the fuel supply unit on the liner in accordance with the first embodiment of the present disclosure.
Figure 6:
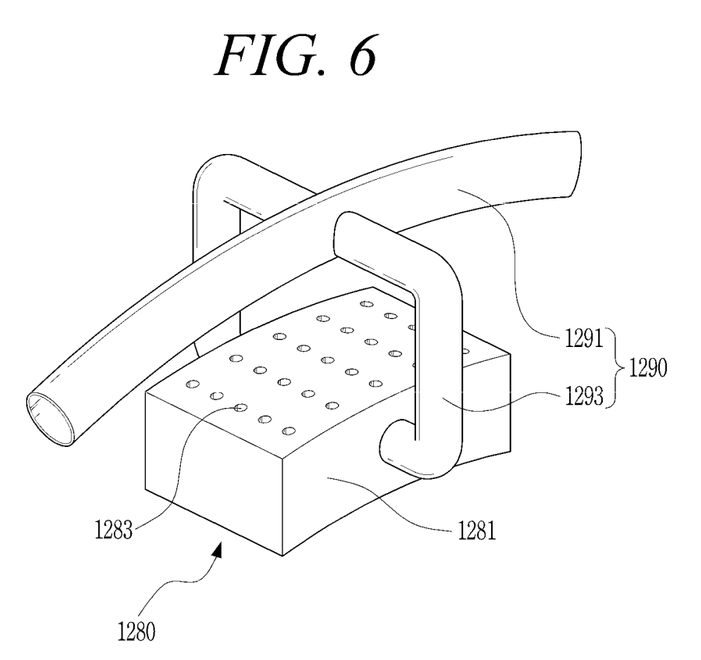
FIG. 6 is perspective view of a resonance module and the fuel supply unit in accordance with the first embodiment of the present disclosure.
Figure 7:
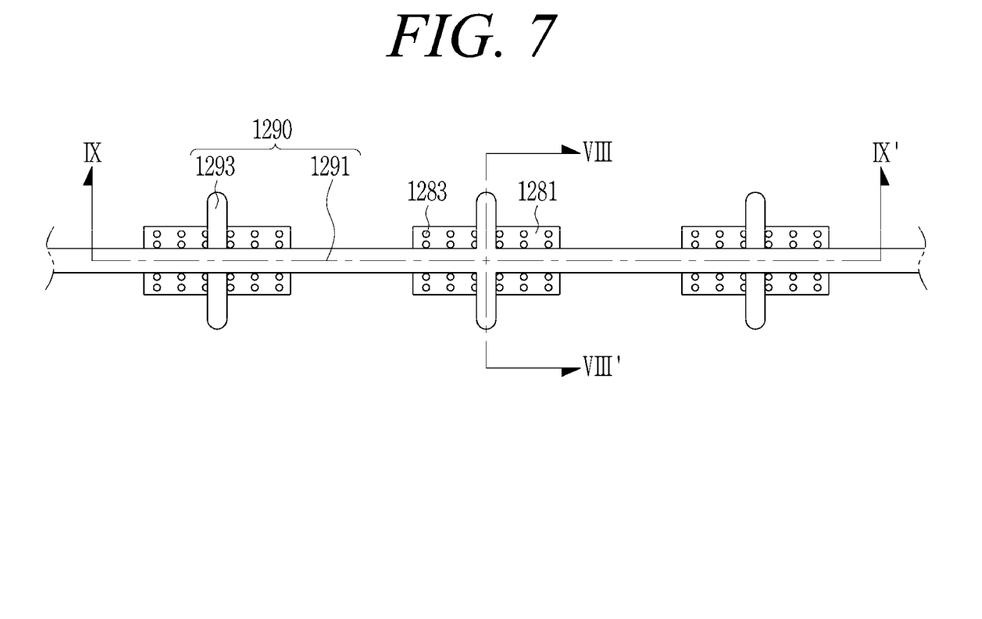
FIG. 7 is a plan view illustrating the resonance modules and the fuel supply unit disposed on the liner in accordance with the first embodiment of the present disclosure.
Figure 8:
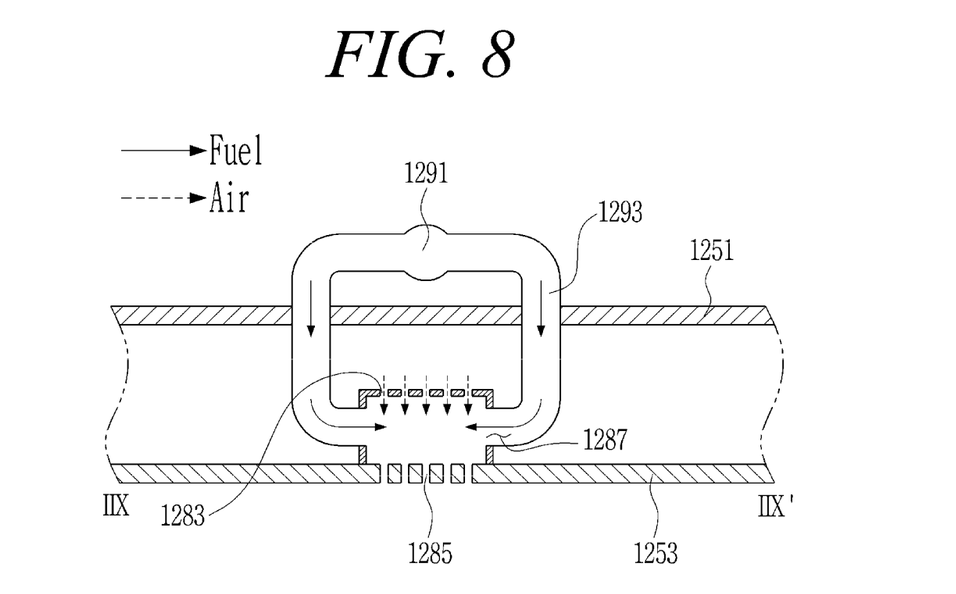
FIG. 8 is a sectional view taken along line VIII-VIII' of FIG. 7.
Figure 9:
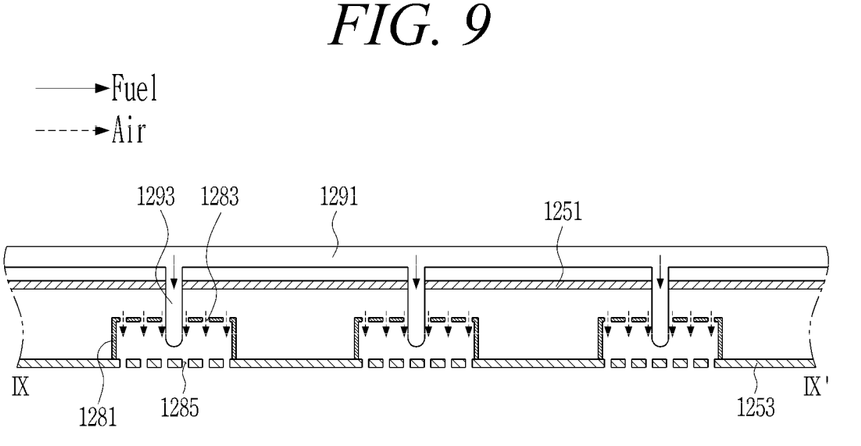
FIG. 9 is a sectional view taken along line IX-IX' of FIG. 7.

The main supply pipe 1291 may be a pipe-shaped member and may be disposed along the circumferential direction on an outer circumferential surface of the outer liner 1251. The main supply pipe 1291 may be coupled to an external fuel supply device (not shown) to receive fuel to be supplied to the resonance modules 1280. In the present embodiment, the main supply pipe 1291 and the plurality of resonance modules 1280 may be disposed parallel to each other. In other words, the main supply pipe 1291 may be disposed parallel to an imaginary line connecting the plurality of resonance modules 1280 to each other. Consequently, when viewed in a direction perpendicular to the outer circumferential surface of the inner liner 1253, the main supply pipe 1291 and the plurality of resonance modules 1280 may overlap each other. The main supply pipe 1291 may encircle the outer liner 1251, as shown in FIG. 5.

The plurality of connection pipes 1293 may couple the main supply pipe 1291 to the respective resonance modules 1280. The plurality of connection pipes 1293 may couple the main supply pipe 1291 to the respective resonance modules 1280. The plurality of connection pipes 1293 may be coupled to respective fuel inlets 1287 of the main bodies 1281 of the resonance modules 1280. Here, the plurality of connection pipes 1293 may diverge from the main supply pipe 1291 outside the outer liner 1251. The plurality of connection pipes 1293 having the above-mentioned configuration may pass through the outer liner 1251 and be coupled to the respective resonance modules 1280 disposed on the outer circumferential surface of the inner liner 1253.

A pair of connection pipes 1293 (FIG. 5) that diverge from the main supply pipe 1291 may be respectively coupled to opposite side surfaces of the main body 1281 (FIG. 4) of a corresponding resonance module 1280. Here, the connection pipes 1293 may be disposed perpendicular to the main supply pipe 1291 or may otherwise be disposed along a line intersecting the main supply pipe 1291.

In other words, according to the present embodiment, fuel supplied to the main supply pipe 1291 may be drawn into the main body 1281 through the connection pipes 1293. Fuel drawn into the main body 1281 may be mixed with compressed air drawn into the main body 1281 through the first through-holes 1283. The mixture of the fuel and the compressed air may be supplied to the interior of the inner liner 1253 through the second through-holes 1285 of the inner liner 1253.

In an upstream side of the liner 1250, compressed air and fuel may be injected from the plurality of fuel nozzles 1230 of the burner 1220 and combusted in the combustion chamber 1240 defined in the liner 1250. Furthermore, compressed air and fuel may be injected to a downstream side of the liner 1250 through the plurality of resonance modules 1280. As such, since compressed air and fuel are injected not only to the upstream side of the liner 1250 but also to its downstream side, generation of nitride oxides, etc. due to combustion may be reduced.

Referring again to FIG. 2, the liner 1250 is disposed downstream of the burner 1220. In the combustion chamber 1240 formed in the liner 1250, fuel and compressed air injected from the combustion nozzles 1230 of the burner 1220 may be combusted. The liner 1250 may have a double-shell structure including the inner liner 1253 and the outer liner 1251, as described above. Meanwhile, the transition piece 1260 is disposed at the downstream side of the liner 1250. The transition piece 1260 may transfer high-pressure gas generated in the liner 1250 to the turbine 1300 at high speeds. The transition piece 1260 may have a double-shell structure including an inner transition piece 1263 and an outer transition piece 1261. In other words, the transition piece 1260 may have a double-shell structure in which the outer transition piece 1261 encloses the inner transition piece 1263. Here, the inner transition piece 1263 is also a hollow tubular member in the same manner as that of the inner liner 1253, but the inner transition piece 1263 may have a shape in which the diameter is gradually reduced from the liner 1250 to the turbine 1300.

The inner liner 1253 and the inner transition piece 1263 may be coupled to each other by a plate spring seal (not shown). Because one end of the inner liner 1253 and one end of the inner transition piece 1263 are respectively fixed to the combustor 1200 and the turbine 1300, the plate spring seal should have a structure capable of absorbing length and diameter extension due to thermal expansion so as to reliably support the inner liner 1253 and the inner transition piece 1263.

Furthermore, there is a need to appropriately cool the combustor 1200 because the combustor 1200 forms the highest temperature environment in the gas turbine 1000. Compressed air flows along outer surfaces of the liner 1250 and the transition piece 1260 through which high-temperature combustion gas flows, and then is supplied toward the combustion nozzles 1230. During this process, the liner 1250 and the transition piece 1260 that have been heated by high-temperature combustion gas may be appropriately cooled.

The gas turbine 1000 in accordance with the present embodiment has a structure in which the outer liner 1251 and the outer transition piece 1261 enclose the inner liner 1253 and the inner transition piece 1263. Compressed air may pass both through an annular space between the inner liner 1253 and the outer liner 1251 and through an annular space between the inner transition piece 1263 and the outer transition piece 1261. Compressed air passing through these annular spaces may cool the inner liner 1253 and the inner transition piece 1263.

A plurality of first cooling holes 1265 may be formed in the outer transition piece 1261 enclosing the inner transition piece 1263. The plurality of first cooling holes 1265 are holes passing through the outer transition piece 1261. Air (hereinafter referred to as "jet flow") passing through the plurality of first cooling holes 1265 may perpendicularly collide with the outer surface of the inner transition piece 1263 and cool the inner transition piece 1263.

A plurality of second cooling holes 1255 may be formed in the outer liner 1251 enclosing the inner liner 1253. The plurality of second cooling holes 1255 are holes passing through the outer liner 1251. In the same manner as the first cooling holes 1265, jet flows passing through the plurality of second cooling holes 1255 may perpendicularly collide with the outer surface of the inner liner 1253 and cool the inner liner 1253.

High-temperature and high-pressure combustion gas generated from the combustor 1200 is supplied to the turbine 1300 through the liner 1250 and the transition piece 1260. In the turbine 1300, combustion gas expands through an adiabatic expansion process and collides with a plurality of turbine blades 1310 radially disposed on the rotating shaft of the turbine 1300 so that reaction force is applied to the turbine blades 1310. Thus, thermal energy of the combustion gas is converted into mechanical energy by which the rotating shaft is rotated. Some of the mechanical energy obtained in the turbine 1300 is supplied as energy needed to compress air in the compressor, and the residual mechanical energy is used as valid energy for driving a generator to produce electric power, or the like.

Hereinafter, a gas turbine 1000 including a combustor 1200 in accordance with a second embodiment of the present disclosure will be described with reference to FIG. 10 in which a plurality of resonance modules 1280 and a fuel supply unit 1290 are disposed on a transition piece 1260 of the gas turbine 1000. Here, except for structure relative to the resonance modules 1280 and the fuel supply unit 1290, the structure of the gas turbine 1000 of the second embodiment is the same as that of the first embodiment described above. Therefore, descriptions of the corresponding structure will be omitted.

In the combustor 1200 in accordance with the present embodiment, the plurality of resonance modules 1280 and the fuel supply unit 1290 may be disposed on the transition piece 1260. The plurality of resonance modules 1280 may be attached to an outer circumferential surface of the transition piece 1260 and arranged along a circumferential direction of the transition piece 1260 so that resonance space is formed on the outer circumferential surface of the transition piece 1260, thus reducing combustion vibration which generates during a combustion process. Furthermore, the fuel supply unit 1290 may supply fuel to each of the plurality of resonance modules 1280. Here, compressed air and fuel supplied through the resonance modules 1280 are mixed with each other and introduced into an interior of the transition piece 1260, whereby generation of nitride oxides, etc. in the combustion chamber 1240 may be reduced.

The plurality of resonance modules 1280 may be attached to the outer circumferential surface of the inner transition piece 1263. The plurality of resonance modules 1280 may be arranged at positions spaced apart from each other along the circumferential direction of the transition piece 1260. As shown in FIG. 10, the plurality of resonance modules 1280 form one line and are arranged along the circumferential direction of the inner transition piece 1263. However, the present disclosure is not limited to this. For example, the plurality of resonance modules 1280 may be arranged to form two or more lines. The structure of each of the plurality of resonance modules 1280 in accordance with the present embodiment may be the same as that of the resonance module of the above-described first embodiment.

The fuel supply unit 1290 for supplying fuel may be coupled to the plurality of resonance modules 1280. The fuel supply unit 1290 may be provided in the form of a manifold, as shown in FIG. 5, for supplying fuel into the plurality of resonance modules 1280 and may include a main supply pipe 1291 (FIG. 5) and a plurality of connection pipes 1293 (FIG. 5).

As described with respect to the FIG. 5, the main supply pipe 1291 may be a pipe-shaped member and may be disposed along the circumferential direction on the outer circumferential surface of the outer transition piece 1261. Further, the main supply pipe 1291 may be coupled to an external fuel supply device (not shown) to receive fuel to be supplied to the resonance modules 1280. In the present embodiment, the main supply pipe 1291 and the plurality of resonance modules 1280 may be disposed parallel to each other. In other words, the main supply pipe 1291 may be disposed parallel to an imaginary line connecting the plurality of resonance modules 1280 to each other. Consequently, when viewed in a direction perpendicular to the outer circumferential surface of the inner transition piece 1263, the main supply pipe 1291 and the plurality of resonance modules 1280 may overlap each other. The main supply pipe 1291 may encircle the outer transition piece 1261.

Further with respect to FIG. 5, a pair of connection pipes 1293 that diverge from the main supply pipe 1291 may be respectively coupled to opposite side surfaces of the main body 1281 (refer to FIG. 4) of a corresponding resonance module 1280. Here, the connection pipes 1293 may be disposed perpendicular to the main supply pipe 1291 or may otherwise be disposed along a line intersecting the main supply pipe 1291.

Figure 10:
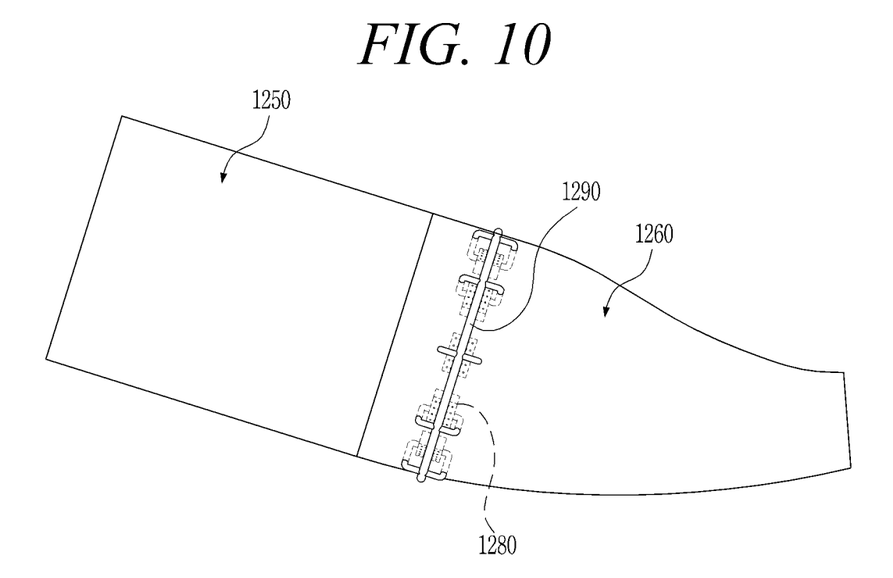
FIG. 10 is a diagram schematically illustrating a disposition of resonance modules and a fuel supply unit on a transition piece of a gas turbine in accordance with a second embodiment of the present disclosure.

As described above, embodiments of the present disclosure include a configuration of the plurality of resonance modules 1280 according to a first disposition as shown in FIG. 3 and a configuration of the plurality of resonance modules 1280 according to a second disposition as shown in FIG. 10. In the first disposition, the plurality of resonance modules 1280 are arranged with respect to an outer circumferential surface of the liner 1250 at positions spaced apart from each other along a circumferential direction of the liner 1250. In the second disposition, the plurality of resonance modules 1280 are arranged with respect to an outer circumferential surface of the transition piece 1260 at positions spaced apart from each other along a circumferential direction of the transition piece 1260.

As described above, in a combustor and a gas turbine in accordance with the present disclosure, generation of combustion vibration may be reduced during a combustion process.

Furthermore, generation of nitrogen oxides in the combustor may be reduced.

While the present disclosure has been described with respect to the specific embodiments, it will be apparent to those skilled in the art that various changes or modifications of the invention are possible by adding, changing, or deleting components without departing from the spirit and scope of the invention as defined in the following claims. It should be noted that these changes or modifications also fall within the bounds of the invention.

As such, although the present disclosure has been described with respect to the limited embodiments and drawings, the present disclosure is not limited to these. Those skilled in the art may appreciate that various changes and modifications are possible within the scope defined by the technical spirit of the present disclosure and other equivalents to the accompanying claims.

What is claimed is:

1. A combustor comprising:
a burner including a plurality of nozzles configured to mix fuel with compressed air and to eject a mixture of the fuel and the compressed air;
a liner that is coupled to one end of the burner and forms a combustion chamber in which the fuel-air mixture is combusted to produce high-pressure gas;
a transition piece configured to receive a flow of the high-pressure gas from the liner and to discharge the high-pressure gas to a turbine;
a plurality of resonators spaced apart from each other along a circumferential direction of the liner; and
a fuel supply unit coupled to each of the plurality of resonators and configured to supply fuel to each of the plurality of resonators,
wherein the liner comprises an inner liner in which the combustion of the mixture occurs, and an outer liner enclosing the inner liner and spaced apart from the inner liner by a predetermined distance, and
wherein the plurality of resonators are disposed on an outer circumferential surface of the inner liner at positions spaced apart from each other along the circumferential direction,
wherein the fuel supply unit comprises:
a main supply pipe disposed along the circumferential direction above an outer circumferential surface of the outer liner and configured to receive fuel from an external fuel supply device; and
a plurality of connection pipes each coupled at one end to the main supply pipe and at the other end to one of the plurality of resonators and configured to supply the fuel from the main supply pipe to the one resonator.

2. The combustor according to claim 1, wherein the main supply pipe encircles the outer liner.

3. The combustor according to claim 1, wherein the plurality of connection pipes include a plurality of pairs of connection pipes, and each pair is respectively coupled to opposite side surfaces of a resonator among the plurality of resonators.

4. The combustor according to claim 1, wherein each of the plurality of resonators comprises a main body including:
an upper surface in which a plurality of first through-holes are formed to communicate with an interior space of the main body in order to draw compressed air into the interior space; and
a bottom side coupled to the outer circumferential surface of the inner liner, the bottom side of the main body surrounding an area of the inner liner in which a plurality of second through-holes are formed to communicate with an inner surface of the inner liner,
wherein the compressed air is drawn into the resonator through the plurality of first through-holes and flows through the plurality of second through-holes.

5. The combustor according to claim 4, wherein the main body has one of a cylindrical shape and a prismatic shape by which the interior space is defined.

6. The combustor according to claim 4, wherein the main body and the main supply pipe overlap each other in a direction perpendicular to the outer circumferential surface of the inner liner.

7. A combustor comprising:
a burner including a plurality of nozzles configured to mix fuel with compressed air and to eject a mixture of the fuel and the compressed air;
a liner that is coupled to one end of the burner and forms a combustion chamber in which the fuel-air mixture is combusted to produce high-pressure gas;
a transition piece configured to receive a flow of the high-pressure gas from the liner and to discharge the high-pressure gas to a turbine;
a plurality of resonators spaced apart from each other along a circumferential direction of the transition piece; and
a fuel supply unit coupled to each of the plurality of resonators and configured to supply fuel to each of the plurality of resonators,
wherein the transition piece comprises an inner transition piece through which the high-pressure gas flows, and an outer transition piece enclosing the inner transition piece and spaced apart from the inner transition piece by a predetermined distance, and
wherein the plurality of resonators are disposed on an outer circumferential surface of the inner transition piece at positions spaced apart from each other along the circumferential direction,
wherein the fuel supply unit comprises:
a main supply pipe disposed along the circumferential direction above an outer circumferential surface of the outer transition piece and configured to receive fuel from an external fuel supply device; and
a plurality of connection pipes each coupled at one end to the main supply pipe and at the other end to one of the plurality of resonators and configured to supply the fuel from the main supply pipe to the one resonator.

8. The combustor according to claim 7, wherein the main supply pipe encircles the outer transition piece.

9. The combustor according to claim 7, wherein each of the plurality of resonators comprises a main body including:
an upper surface in which a plurality of first through-holes are formed to communicate with an interior space of the main body in order to draw compressed air into the interior space; and
a bottom side coupled to the outer circumferential surface of the inner transition piece, the bottom side of the main body surrounding an area of the inner transition piece in which a plurality of second through-holes are formed to communicate with an inner surface of the inner transition piece,
wherein the compressed air is drawn into the resonator through the plurality of first through-holes and flows through the plurality of second through-holes.

10. The combustor according to claim 9, wherein the main body and the main supply pipe overlap each other in a direction perpendicular to the outer circumferential surface of the inner transition piece.

11. A gas turbine comprising a compressor to compress air, a combustor to produce combustion gas by mixing fuel with the compressed air and combusting the mixture, and a turbine configured to be rotated by the combustion gas to generate power, the combustor comprising:
a burner including a plurality of nozzles configured to mix the fuel with the compressed air and to eject a mixture of the fuel and the compressed air;
a liner that is coupled to one end of the burner and forms a combustion chamber in which the fuel-air mixture is combusted to produce high-pressure gas;
a transition piece configured to receive a flow of the high-pressure gas from the liner and to discharge the high-pressure gas to a turbine;

a plurality of resonators configured according to one of
- a first disposition with respect to an outer circumferential surface of the liner at positions spaced apart from each other along a circumferential direction of the liner, and
- a second disposition with respect to an outer circumferential surface of the transition piece at positions spaced apart from each other along a circumferential direction of the transition piece; and a fuel supply unit coupled to each of the plurality of resonators and configured to supply fuel to each of the plurality of resonators, wherein the liner comprises an inner liner in which the combustion of the mixture occurs, and an outer liner enclosing the inner liner and spaced apart from the inner liner by a predetermined distance, the plurality of resonators are disposed on an outer circumferential surface of the inner liner, and wherein the transition piece comprises an inner transition piece through which the high-pressure gas flows, and an outer transition piece enclosing the inner transition piece and spaced apart from the inner transition piece by a predetermined distance, the plurality of resonators are disposed on an outer circumferential surface of the inner transition piece, wherein the fuel supply unit comprises:
- a main supply pipe arranged along the circumferential direction and configured to receive fuel from an external fuel supply device; and
- a plurality of connection pipes each coupled at one end to the main supply pipe and at the other end to one of the plurality of resonators and configured to supply the fuel from the main supply pipe to the one resonator, wherein the main supply pipe is disposed on one surface of an outer circumferential surface of the outer liner and an outer circumferential surface of the outer transition piece, according to the one of the first and second dispositions.

12. The gas turbine according to claim 11, wherein the main supply pipe encircles one of the outer liner and the outer transition piece, according to the one of the first and second dispositions.

13. The gas turbine according to claim 11, wherein each of the plurality of resonators comprises a main body including:
- an upper surface in which a plurality of first through-holes are formed to communicate with an interior space of the main body in order to draw compressed air into the interior space; and
- a bottom side coupled to the outer circumferential surface of one of the inner liner and the outer circumferential surface of the inner transition piece according to the one of the first and second dispositions, the bottom side of the main body surrounding a plurality of second through-holes formed to communicate with an inner surface of the one of the inner liner and the inner transition piece wherein the compressed air is drawn into the resonator through the plurality of first through-holes and flows through the plurality of second through-holes.

14. The gas turbine according to claim 13, wherein the main body and the main supply pipe overlap each other in a direction perpendicular to the upper surface of the main body.

* * * * *